(12) United States Patent
Haddad

(10) Patent No.: US 8,438,381 B2
(45) Date of Patent: May 7, 2013

(54) SECURING IP TRAFFIC

(75) Inventor: Wassim Haddad, Boulder, CO (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 655 days.

(21) Appl. No.: 12/531,544

(22) PCT Filed: Mar. 16, 2007

(86) PCT No.: PCT/EP2007/052542
§ 371 (c)(1),
(2), (4) Date: Feb. 25, 2010

(87) PCT Pub. No.: WO2008/113405
PCT Pub. Date: Sep. 25, 2008

(65) Prior Publication Data
US 2010/0153706 A1      Jun. 17, 2010

(51) Int. Cl.
*H04L 29/06* (2006.01)
(52) U.S. Cl.
USPC ............................... 713/153; 370/392; 726/3
(58) Field of Classification Search .................. 713/153, 713/150; 726/3, 15; 370/392
See application file for complete search history.

(56) References Cited

U.S. PATENT DOCUMENTS

| | | | |
|---|---|---|---|
| 6,014,667 A * | 1/2000 | Jenkins et al. ........................ | 1/1 |
| 7,571,463 B1 * | 8/2009 | Fedyk et al. ..................... | 726/3 |
| 7,908,481 B1 * | 3/2011 | Donzis et al. ................. | 713/171 |
| 2002/0133607 A1 * | 9/2002 | Nikander ...................... | 709/229 |
| 2003/0074565 A1 * | 4/2003 | Wasilewski et al. .......... | 713/182 |
| 2003/0161309 A1 * | 8/2003 | Karuppiah .................... | 370/392 |
| 2003/0211842 A1 * | 11/2003 | Kempf et al. ................. | 455/411 |
| 2004/0117653 A1 * | 6/2004 | Shapira et al. ................ | 713/201 |
| 2006/0067365 A1 * | 3/2006 | Venkataramana et al. .... | 370/474 |
| 2006/0075258 A1 * | 4/2006 | Adamson et al. ............. | 713/189 |
| 2007/0214502 A1 * | 9/2007 | McAlister ....................... | 726/15 |
| 2007/0260884 A1 * | 11/2007 | Venkitaraman et al. ...... | 713/169 |
| 2008/0117844 A1 * | 5/2008 | Thubert et al. ................ | 370/310 |
| 2008/0137659 A1 * | 6/2008 | Levy-Abegnoli et al. .... | 370/392 |
| 2008/0187137 A1 * | 8/2008 | Nikander et al. ............. | 380/270 |

OTHER PUBLICATIONS

S. Cheshire, "IPv4 Address Conflict Detection", Jul. 1, 2008, IP.com.*
Kempf, James et al. IP Address Authorization for Secure Address Proxying Using Multi-key CGAs and Ring Signatures. Advances in Information and Computer Security LNCS, Springer Berlin Heidelberg. vol. 4266. 2006.
Arkko, J et al. SEcure Neighbor Discovery (SEND); rfc3971.txt. IETF Standard, Internet Engineering Task Force. Ch Mar. 2005.

\* cited by examiner

*Primary Examiner* — Taghi Arani
*Assistant Examiner* — Gregory Lane

(57) ABSTRACT

A method of securing IP traffic sent from a first host to a second host attached respectively to first and second access points. The method comprises establishing a shared secret between said first and second hosts, and for each packet to be sent, using the next value in a pseudo-random number sequence as an interface identifier part of the source IP address.

9 Claims, 3 Drawing Sheets

SECURING IP TRAFFIC

TECHNICAL FIELD

The present invention relates to securing Internet Protocol traffic and more particularly, though not necessarily, to encrypting Internet Protocol traffic in a secure but efficient manner and or providing anonymity for a sender and receiver.

BACKGROUND

By itself, the Internet Protocol (IP) provides no inherent security. Both packet headers, containing inter alia source and destination addresses, and payload data is sent in plain text. Other mechanisms are required in addition to the basic IP protocols in order to provide security. The most widely used security mechanism is IPSec, which consists of a suite of protocols including protocols for negotiating security associations (defining shared secrets) between parties and protocols for encrypting data. IPSec is obligatory for IPv6 but optional for IPv4. IPSec can operate either in Transport Mode or in Tunnel Mode. In the former, only the payload of IP packets is encrypted, whilst in the latter the payload and original IP header are encrypted, with a further outer header being added to allow routing of the packet.

In the case of the Tunnel Mode, addition of an IPv6 header will add at least two 128 bit fields to every packet. In the case of IPv4, two 64 bit fields will be added. As well as occupying bandwidth, the additional bits represent a significant overhead where packets are transmitted over an air interface, in terms of transceiver power consumption. This is especially problematic in the case of battery powered mobile devices. Furthermore, IPSec is "strict" in terms of compliance, and it does not offer any flexibility with respect to what to encrypt and what not to encrypt. All of the original packet including the header must be encrypted.

In the case of Transport Mode, the payload alone must be encrypted. As with Tunnel Mode, Transport Mode offers no flexibility in this regard, e.g. it is not possible to selectively encrypt parts of the packet header.

Prior art security mechanisms are deficient to a large extent in that they may leak information concerning the identity and/or location of a packet sender or receiver. For example, a third party may be able to determine that a stream of packets are associated with the same sender or receiver by observing repeated use of the same source or destination IP address.

U.S. Pat. No. 6,104,811 describes an encryption mechanism that can be applied to secure TCP/IP payload data. A pseudo-random number generator is used to produce a bit string which can be used as a pad for one-time pad encryption data. One-time pad encryption is a well known technique for encrypting data exchanged between two parties. It involves making a pad consisting of a string of random numbers available to both parties. The sending party XORs the data to be encrypted with a block of the pad to generate encrypted data, whilst the receiving party can decrypt the encrypted data by XORing the same pad block with the encrypted data. Providing that the pad is not made available to third parties, one-time pad translation provides excellent security.

WO2006084895 describes a mechanism for "cloaking" repetitive or sequential data within IP packet headers which may be used by attackers to link together sequences of packets, for example in order to track movements of a mobile terminal user. The mechanism requires that users share a secret key (e.g. negotiated during the IKE setup phase of IPSec), and that they use this key to generate common sequences of pseudo-random numbers. The sender then replaces each data item to be cloaked with the next value in the random number sequence. The receiver, having access to the same sequence, can identify the position of a received packet within a sequence, and uses a mapping function to replace the cloaked data with the original data.

SUMMARY

It is an object of the invention to provide a mechanism for securing IP packets which allows selective encryption of data within the packets, and which does not significantly increase packet size. It is also an object of the present invention to provide a mechanism for introducing a degree of anonymity to an IP session and in particular to provide for the "encoding" of source and or destination IP addresses so that these addresses change in a random fashion from one packet to the next.

According to a first aspect of the present invention there is provided a method of hiding data within packets of an IP session between first and second hosts and which may be used to link packets of the session, the first and second hosts being attached respectively to first and second access points, the method comprising:

using as interface identifier within the source address an interface identifier generated using a destination group key and a destination host identifier, both the destination group key and the destination host identifier being known to said first host and said second access point;

maintaining a mapping at said second host between a network prefix of said first access router, said destination host identity and a local access network address of said second host;

upon receipt of a packet at said second access point from said first host, identifying said destination group key using the network prefix of the packet source address, and using the destination group key and the destination host address to map the interface identifier part of the source address to a local access network address; and using said local access network address to forward the packet to said second host.

Preferably, the step of generating an interface identifier comprises:

generating a pseudo-random number;

combining the pseudo random number with said destination group key using a cryptographic function to generate a pseudo-random interface identifier; and combining said pseudo-random interface identifier with said destination host identifier using an invertible function.

More preferably, said invertible function is an XOR function. The cryptographic function may be, for example, a stream cipher or a block cipher.

Preferably, said pseudo-random number is included in the packet header.

Preferably, the steps carried out at said second access point upon receipt of a packet include:

combining the pseudo-random number and the destination group key using said cryptographic function to generate a pseudo-random interface identifier;

combining this pseudo-random interface identifier with the interface identifier part of the packet source address using said invertible function; and verifying that the result matches a destination host identity cached at the second access point.

According to a second aspect of the present invention there is provided a method of hiding data within packets of an IP session between first and second hosts and which may be used to link packets of the session, the first and second hosts being attached respectively to first and second access points, the method comprising:
    at said first host, receiving a destination group key from said second host and generating a destination host identifier;
    providing said destination group key and said destination host identifier to said second access point, and mapping the destination host identifier to an access network address of said second host;
    for each packet to be sent from the first host to the second host, at the first host, generating a pseudo-random number, using said pseudo-random number and said destination group key to generate a pseudo-random identifier, combining said pseudo-random number with said destination host identifier using an invertible function to generate a new interface identifier, including the new interface identifier in the packet source address, and including said pseudo-random number in the packet header;
    at said second access router, receiving a packet sent by said first host, identifying said destination group key using the network prefix of the source address, using said pseudo-random number and said destination group key to generate a pseudo-random identifier, combining said pseudo-random number with said new interface identifier using said invertible function, validating the result as matching a cached destination host identifier and identifying the corresponding local network address, and forwarding the packet to the second host using said local network address.

According to a third aspect of the present invention there is provided a network node arranged to act as an access point for a second host, the node comprising:
    an input for receiving a packet from a first host; and
    means for identifying a destination group key using the network prefix of the packet source address, and for using the destination group key and the destination host address to map the interface identifier part of the destination address to a local access network address.

According to a fourth aspect of the present invention there is provided a method of securing IP traffic sent from a first host to a second host attached respectively to first and second access points, the method comprising:
    establishing a shared secret between said first and second hosts; and
    for each packet to be sent, using the next value in a pseudo-random number sequence as an interface identifier part of the source IP address.

According to a fifth aspect of the present invention there is provided a terminal comprising:
    means for establishing a shared secret between the terminal and a peer terminal; and
    for each packet to be sent, means for using the next value in a pseudo-random number sequence as an interface identifier part of the source IP address.

According to a sixth aspect of the present invention there is provided a method of securing IP packets to be transmitted over an IP network, the method comprising:
    for each packet to be sent, using the next number of a pseudo-random number sequence together with a secret key to generate a pad and combining the pad with the packet using an invertible function, and including in the packet header the used pseudo-random number.

Embodiments of the invention allow a receiver of encrypted data to be provided with a "sequence number", i.e. the sent pseudo-random number, which it can use, together with the shared secret, to generate a copy of the required pad. Use of the sequence number in this manner prevents successful replay attacks by third parties eavesdropping on peer-to-peer communications. Moreover, as the sequence number belongs to a pseudo-random number sequence, a third party eavesdropping on sent packets is not able to correlate packets as belonging to a common session.

In a preferred embodiment of the invention, a counter is maintained and incremented following the generation of a pad. The counter value is combined with a further secret key to generate the next value in said pseudo-random number sequence.

In one embodiment of the invention, said pad is constructed such that its combination with the packet leaves certain predefined portions of the packet unchanged. In particular, the pad is constructed such that the source and destination address fields packet headers remain unchanged.

In a preferred embodiment of the invention, said invertible function is an XOR or NOT XOR function. In the case of an XOR function, bits of the pad corresponding to bits of the packet which are not to be altered, are set to "0". In the case of a NOT XOR function, these bits are set to "1".

According to a seventh aspect of the present invention there is provided there is provided a terminal arranged in use to send IP packets to a peer terminal, the terminal comprising:
    a pseudo-random number sequence generator; and
    a processor arranged, for each packet to be sent, to use the next number of said sequence together with a secret key to generate a pad, to combine the pad with the packet using an invertible function, and to include in the packet header the used pseudo-random number.

The terminal may also be arranged in use to receive IP packets from a peer terminal, the terminal comprising:
    means for extracting a pseudo-random number from a packet header;
    a processor arranged to use a secret key and said pseudo-random number to generate a pad, and to combine the pad with the packet using said invertible function.

DETAILED DESCRIPTION

Figure 1:
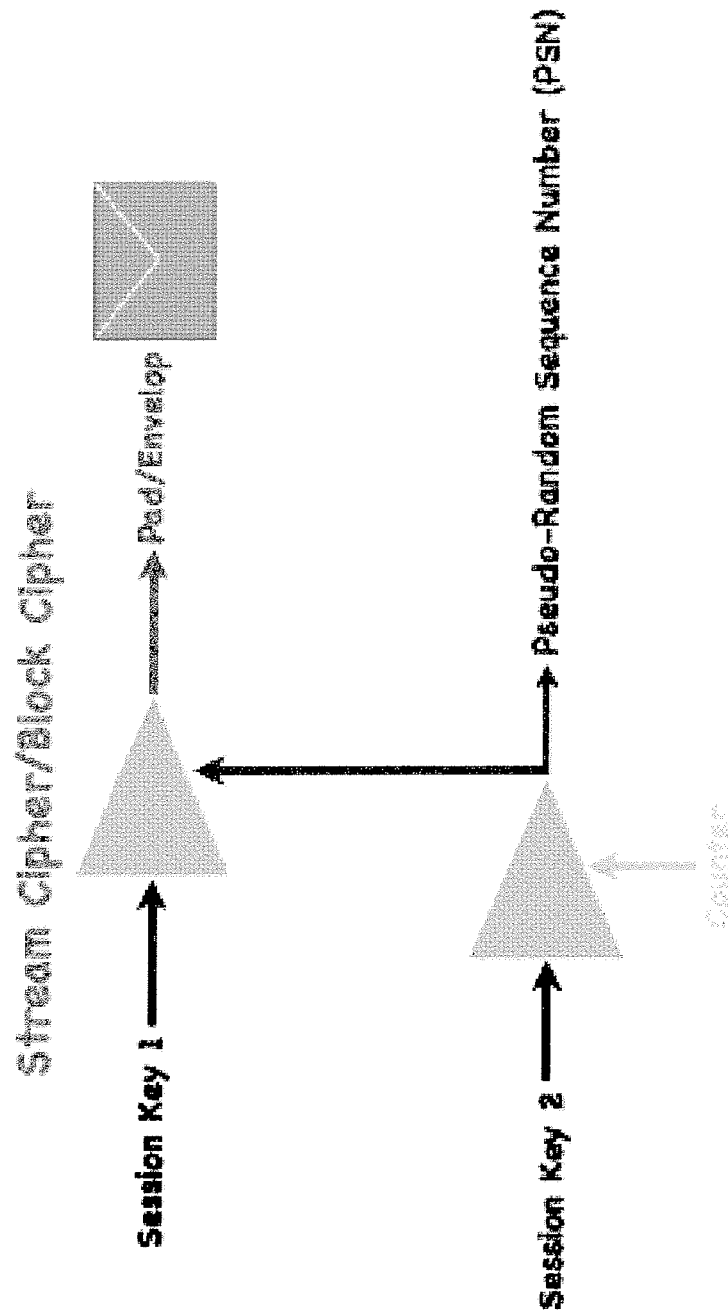
FIG. 1 illustrates schematically a function for encrypting IP packets.

There is illustrated in FIG. 1 a system level architecture for a "One Time Pad Encryption" (OTPE) function which is implemented at an IP packet sender. The function is implemented beneath the IP layer at the sender. A stream cipher 1 receives as a first input a first session key (Session key 1) and as a second input a 64 bit pseudo-random number. The pseudo-random number is in turn generated by a block cipher 2 which receives as a first input a second session key (Session key 2) and a counter value (Counter). The block cipher is preferably, but not necessarily, an AES encryption function (e.g. in EBC mode). The first and second session keys are 128 bit keys which is shared between the packet sender and a packet receiver. In a typical scenario, such a shared key belongs to a Security Association (SA) which is negotiated between communicating parties, for example using the Internet Key Exchange (IKE) protocol. Alternatively, the session key may be derived from the negotiated IKE key, e.g. by applying a hash function to the latter. Upon receipt of a packet from a higher protocol layer, the OTPE layer uses the destination address contained within the packet header to obtain Session Key 1.

For each packet to be secured using OTPE, the counter value is incremented by 1. The output of the block cipher 2 is a new pseudo-random number. This is fed into the stream cipher which is clocked to generate a pad of appropriate length to secure an IP packet, including the header and payload. In order to avoid having to add a further header containing routable addresses, before application to the packet, bit positions of the pad which correspond to positions of the packet which are not to be encrypted, are reset to "0".

The pad output by the XOR function 3 is then applied to a first input of a second XOR function 4, which receives at its second input the IP packet to be secured. The output of the second XOR function is a cryptographically secured representation of the original IP packet. In order to allow a receiver to decrypt the packet, the packet must include the used pseudo-random number. This is therefore added as a "stamp" to the packet header. Typically, this will require the specification of a new header. However, as will be discussed below, where an anonymity mechanism is employed, it is possible to include the stamp as the Interface Identifier part of the source IPv6 address.

The stamp may contain further information in addition to the 64 bit pseudo-random number. In particular, it may include another 64 bits indicating, for example, confidentiality scope, e.g. identifying the fields secured using pad encryption.

Upon receipt of a packet, the receiver uses the source address contained within the packet header to identify the correct Security Association, and hence obtain the correct session keys (Session Keys 1 and 2). Each packet is applied in turn to the receiver, with a unit 5 extracting the stamp from the packet header.

In order to avoid replay attacks, an initial check is performed by using the pseudo-random number within the stamp and Session Key 2 as inputs to the block cipher. The result corresponds to the counter value. The receiver maintains a counter value window, and the packet is accepted only if the determined counter value lies within this window. Assuming that it does, the pseudo-random number part of the packet is applied to a first input of a stream cipher 6, whilst the first session key is applied to a second input. The output of the stream cipher is the original pad. Bits of the pad corresponding to bits of the packet which are not encrypted are then set to "0". [The confidentiality scope of the packet stamp may be used to determine which bits are to be set to "0".] The modified pad is then applied to a first input of a further XOR function, with the second input receiving the secured packet. The output of the XOR function represents the decrypted packet.

According to the basic OTPE protocol described above, the source and destination addresses within the IP packet header are left unencrypted to allow routing of the packet. Third parties evesdropping on packets can link together sequences of packets using one or both of these addresses. It is desirable to introduce into the OTPE protocol an "anonymity" feature to enable an anonymous sender to exchange data packets with the destination while changing its source address in each data packet in order to reduce the linkability risk as much as possible. This is possible with IPv6 which provides for IP addresses having a 64 bit Interface Identifier (IID) suffix and a 64 bit network prefix. Typically, the IID is chosen by the host terminal and is sent to an Access Router (AR) to which the host is connected, during an attachment procedure. The AR advertises the chosen IID to all other hosts attached to that same router in order to detect IID collisions. The network prefix part of the IP address is a fixed address of the AR and the host is informed of this in an AR advertisement message. By allowing a host to refresh its IID in each data packet sent to a destination, anonymity can be enabled. This means that no particular IID is disclosed in more than one data packet during an ongoing session.

The procedure described here relies upon an acceptance that it is not possible to ensure anonymity for hosts attached to the same access network, i.e. sharing a common AR. This is because, regardless of the source and destination addresses used in packets sent over the local link, the Media Access Control (MAC) addresses used must remain static. Applying this in the case of a set of hosts attached to a first AR and communicating with a set of hosts attached to a second AR means that there is no reduction in the level of security if keys used to provide anonymity of IIDs are shared between the two sets of hosts. Anonymity is provided only in respect of third parties analysing traffic travelling between the two ARs.

The basic OTPE protocol described above relies on using a static IPv6 source address/pseudo-address to enable a receiver to fetch the sender's key (Session Key 1) and generate the corresponding pad to access the native packet. Merely changing the IPv6 source address in a random way in each data packet would result in dropping packets at the receiver side. It follows therefore that any random change in the IPv6 source address IID at the sender side must always enable the receiver to easily fetch the corresponding keys.

In addition to changing the sender's IID in each data packet, it would be highly desirable to also change the receiver's (i.e. destination) IPv6 address. This requires the involvement of an additional node located at the receiver side, typically an AR, in validating each data packet before forwarding it to the receiver.

Consider by way of example a source host S trying to establish a connection with a destination host D. It is assumed that S is attached to an access router AR(S) and that D is attached to an access router AR(D). As part of their respective access router attachment procedures, S will have obtained from AR(S) a network prefix SP, and D will have obtained from AR(D) a network prefix DP. Prior to running a key exchange protocol (e.g. IKE) with D, S requests from AR(S) a group key SGK. This group key is a key assigned by AR(S) to the network prefix used by D, i.e. DP. The same group key will be provided by all hosts using the network prefix SP to communicate with destination hosts using the network prefix DP, i.e. the binding {SGK,SP,DP} is made. AR(S) acts as a group key distributor. Group key distribution is carried out securely using, for example, the OptiSEND protocol (see IETF draft-haddad-mipshop-optisend-02). Group keys have a limited lifetime.

S then initiates the key exchange protocol with D using a static pseudo-IPv6 address. When the initiating message is received by D, D requests a group key DGK from AR(D). This key is similarly bound to DP and SP, i.e. {DGK,DP,SP}. D and S then securely exchange SGK and DGK during the key exchange protocol. Upon receipt of SGK from S, D then generates a unique sender host identity (SHID) and shares it with S. SHID is subsequently used by S to identify packets received from D. S must provide SHID to AR(S). In the same way, upon receipt of DGK at S, S generates a unique destination host identity (DHID) and shares it with D. D provides DHID to AR(D). [It will be appreciated that, rather than exchanging SHID and DHID, S and D may agree upon a mechanism whereby each host is able to independently generate the same identifiers.]

Figure 2:
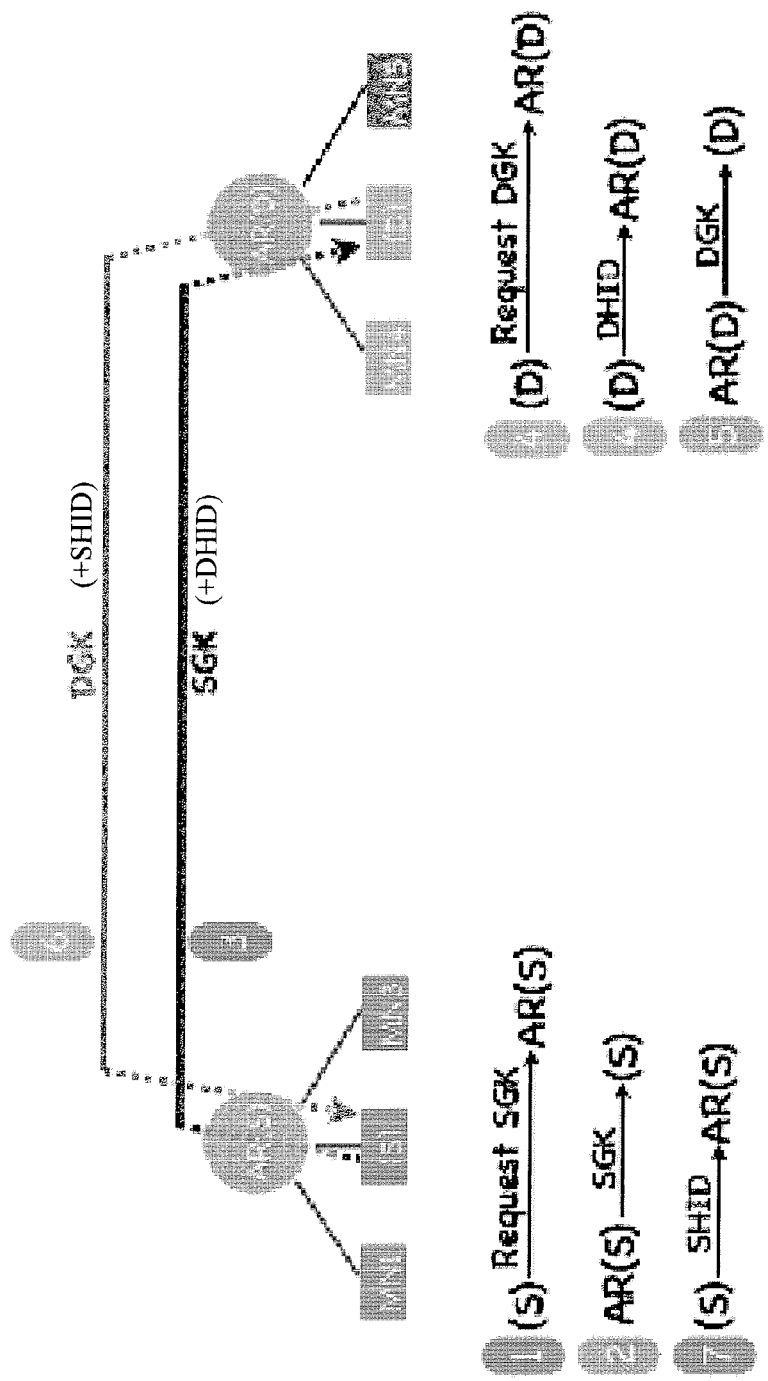
FIG. 2 illustrates schematically key exchange protocol signalling to facilitate address anonymity.

Table 1 below shows the bindings that are maintained at S and D, assuming that each host has established bindings for n different peer hosts (DP1, DP2 . . . DPn in the case of S, and SP1, SP2, . . . SPn in the case of D). Table 2 below shows the bindings maintained at AR(S), assuming that n hosts are currently attached using MAC addresses 1 to n and interface identifiers IID1 to IIDn. A corresponding set of bindings are maintained at AR(D). FIG. 2 illustrates schematically the required message exchange which takes place prior to, and within the key exchange protocol. Of course, at the end of the key exchange protocol, in addition to sharing the host identities DHID and SHID and the group keys SGK and DGK, the hosts S and D will share the two OTPE keys, namely Session Key 1 and Session Key 2 of FIG. 1.

In order to achieve anonymity, for each packet sent by S to D, a new IPv6 IID will be used for S in the following way:

Packets are generated at S and include the fixed IPv6 source and destination address.

S applies the OTPE protocol to encrypt the payload and portions of the packet header including the IID part of the destination address. The network prefixes of the source and destination addresses are not encrypted. As part of this procedure, S will compute the 64-bit pseudo-sequence number (PSN) as illustrated in FIG. 1). PSN is then concatenated with the source network prefix SP to generate a full IPv6 source address.

A new IPv6 IID will be used for D in the following way:

S will use the same mode applied to generate PSN, in order to generate a random identifier, called PRID, that is $PRID=f_{sc}(PSN,SGK)$, where $f_{sc}$ represents the stream cipher.

After generating PRID, S computes the new destination IPv6 IID by XORing PRID and SHID, i.e., new IID=PRID XOR SHID. The new IID is then concatenated with the destination network prefix DP to generate a full IPv6 source address.

Figure 3:
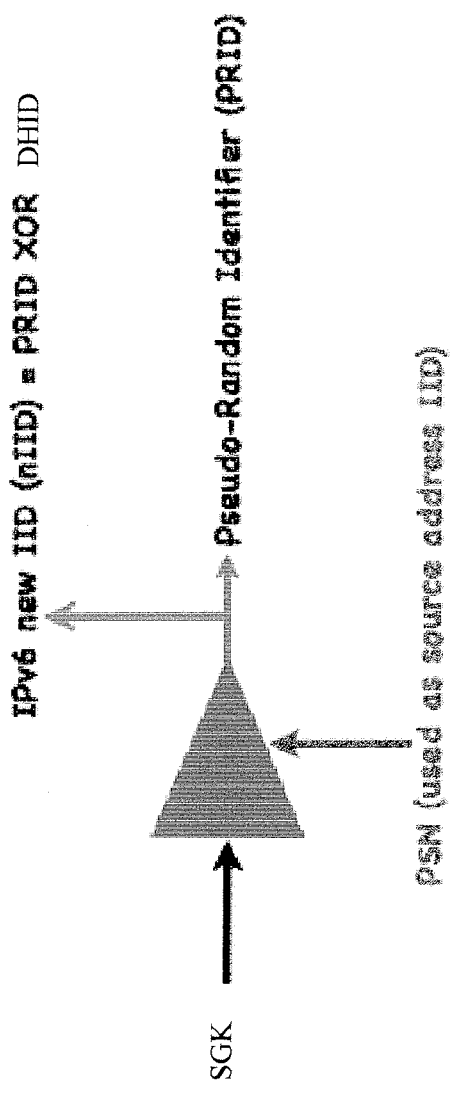
FIG. 3 illustrates schematically a function for including an anonymous source address interface identifier into a packet header.

This mechanism is illustrated in FIG. 3.

The packet sent by S is routed through AR(S) which does not alter any of the addresses in the packet header, other than to strip out the MAC address.

Figure 4:
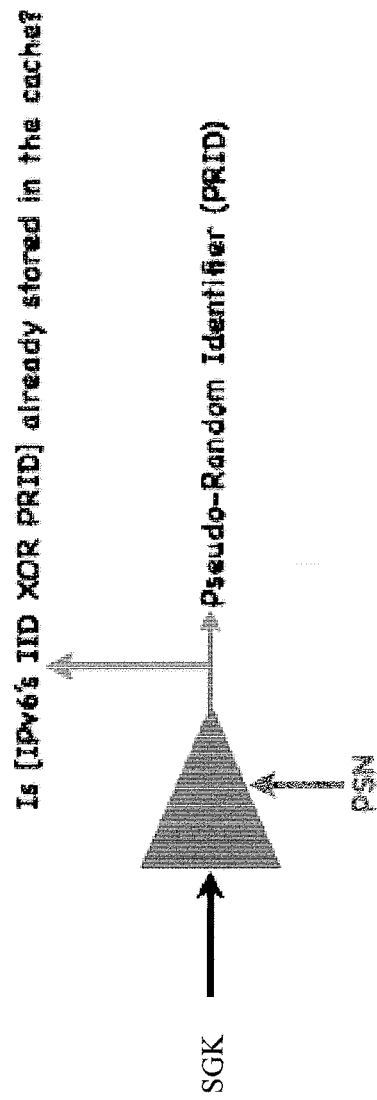
FIG. 4 illustrates schematically a function for recovering the original source address interface identifier.

Packets destined for D arrive at AR(D) as a result of the network prefix of the destination address. AR(D) performs a verification procedure as follows:

AR(D) checks if the source address network prefix is stored in its cache memory. After that, it uses the corresponding SGK together with the PSN, included as the source IID, to generate the PRID, as illustrated in FIG. 4.

The next step after generating the PRID is to XOR it with the destination address IID to generate a SHID. The cache memory at AR(D) is then searched using the resulting 64-bit value as key. If the SHID is found within the cache, AR(D) replaces the original destination address IID with SHID. However, this may not be carried out if it is required top maintain anonymity on the local link.

Using the verified SHID, AR(D) is able to identify the MAC address of D.

AR(D) uses the MAC address to forward the packet to D.

Upon receipt of the packet at D, D repeats the procedure to identify the correct SHID. Using the verified SHID, it identifies the correct Session Key 2. D applies the PSN (included as the source address IID) and Session Key 2 to identify a counter value. If the counter value falls within a current window, the packet is accepted. Session Key 1 and the PSN are then used to decrypt the packet using the OTPE protocol as described above.

It will be readily appreciated that the precedure is effectively reversed when D is the packet sender, and S is the packet receiver. In this case, upon receipt of a packet at AR(S), AR(S) recovers and verifies DHID and performs the necessary substitution. It then identifies the MAC address corresponding to DHID and forwards the packet to S over the local link.

The procedure described above is in many ways optimal as it includes the PSN as the source address IID in the IPv6 packet header. However, an alternative approach is to generate the source address IID using a procedure similar to that used to generate the destination address address IID, i.e. $PRID_2=f_{sc}(PSN,DGK)$ and new IID=$PRID_2$ XOR SHID. In this case, it is necessary to include the PSN in a separate (new) header field.

It will be appreciated by the person of skill in the art that various modifications may be made to the above described embodiments without departing from the scope of the present invention. For example, in order to prevent the Access Routers from gaining knowledge of SHID and DHID, the hosts S and D may use a hash of SHID and DHID to generate the IIDs, and provide only the hash values to the Access Routers.

TABLE 1

| On (S) side: Binding Prefixes, Group Keys and Identifiers | | | | | On (D) side: Binding Prefixes, Group Keys and Identifiers | | | | |
|---|---|---|---|---|---|---|---|---|---|
| DP1 | SGK1 | DGK1 | SHID1 | DHID1 | SP1 | DGK1 | SGK1 | SHID1 | DHID1 |
| DP2 | SGK2 | DGK2 | SHID2 | DHID2 | SP2 | DGK2 | SGK2 | SHID2 | DHID2 |
| DPn | SGKn | DGKn | SHIDn | DHIDn | SPn | DGKn | SGKn | SHIDn | DHIDn |

TABLE 2

| OR the AR(S) side: | | | | | |
|---|---|---|---|---|---|
| Binding between parameters and MAC address | | | | Binding Prefixes and Group Keys | |
| MAC Address(1) | IID1 | OptiSEND_Key(1) + CGA Public Key(1) | H(SHID1) | DP1 | SGK1 |
| MAC Address(2) | IID2 | OptiSEND_Key(2) + CGA Public Key(2) | H(SHID2) | DP2 | SGK2 |

TABLE 2-continued

OR the AR(S) side:

| | | Binding between parameters and MAC address | | Binding Prefixes and Group Keys | |
|---|---|---|---|---|---|
| MAC Address(n) | IIDn | OptiSEND_Key(n) + CGA Public Key(n) | H(SHIDn) | DPn | SGKn |

IID = IPv6 Interface Identifier used by a node when attaching to the AR link
DP = Destination Prefix
SGK = Group Key assigned to DP

The invention claimed is:

1. A method of hiding data within packets of an IP session between first and second hosts which may otherwise be used to link packets of the session, the first and second hosts being attached respectively to first and second access points, the method comprising:
using as interface identifier within the source and/or destination address an interface identifier generated using a group key and a host identity, both the group key and the host identity being known to said first host and said second access point, wherein said generation of said interface identifier comprises:
generating a pseudo-random number;
combining the pseudo random number with said group key using a cryptographic function to generate a pseudo-random interface identifier; and
combining said pseudo-random interface identifier with said host identity using an invertible function;
maintaining a mapping at said second access point between a network prefix of said first access point, said host identity and a local access network address of said second host;
upon receipt of a packet at said second access point from said first host, identifying said group key using the network prefix of the packet source address, and using the group key and the host address to map the interface identifier part of the source and/or destination address to a local access network address; and
using said local access network address to forward the packet to said second host.

2. The method according to claim 1, wherein said second access point uses the group key to map the interface identifier part of the source and/or destination address to a host identity, and if the recovered host identity matches the host identity known to the second access point, the second access point identifies the local access network address and forwards the packet.

3. The method according to claim 1, wherein said invertible function is an XOR function.

4. The method according to claim 1, wherein said cryptographic function is a stream cipher or a block cipher.

5. The method according to claim 1, wherein said pseudo-random number is included in the packet header.

6. The method according to claim 1, the steps carried out at said second access point upon receipt of a packet including:
combining the pseudo-random number and the group key using said cryptographic function to generate a pseudo-random interface identifier;
combining this pseudo-random interface identifier with the interface identifier part of the packet source address using said invertible function; and
verifying that the result matches a host identity cached at the second access point.

7. The method according to claim 1, wherein said recited steps are carried out in respect of only the destination address.

8. The method according to claim 7 and comprising generating a pseudo-random number sequence using a key shared between the first and second hosts, and concatenating the next pseudo-random number in the sequence with the network prefix of the first access router to generate a source address for the next packet to be sent.

9. A method of hiding data within packets of an IP session between first and second hosts and which may be used to link packets of the session, the first and second hosts being attached respectively to first and second access points, the method comprising:
at said first host, receiving a group key from said second host and generating a host identity;
providing said group key and said host identity to said second access point, and
mapping the host identity to an access network address of said second host;
for each packet to be sent from the first host to the second host, at the first host, generating a pseudo-random number, using said pseudo-random number and said group key to generate a pseudo-random identifier, combining said pseudo-random identifier with said host identity using an invertible function to generate a new interface identifier, including the new interface identifier in the packet source or destination address, and including said pseudo-random number in the packet header;
at said second access router, receiving a packet sent by said first host, identifying said group key using the network prefix of the source address, using said pseudo-random number and said group key to generate a pseudo-random identifier, combining said pseudo-random number with said new interface identifier using said invertible function, validating the result as matching a cached host identity and identifying the corresponding local network address, and forwarding the packet to the second host using said local network address.

* * * * *